United States Patent
Oba et al.

[11] 3,906,059
[45] Sept. 16, 1975

[54] PROCESS FOR PREPARING VINYL CHLORIDE POLYMER COMPOSITION HAVING IMPROVED IMPACT STRENGTH AND PROCESSABILITY

[75] Inventors: Seiichiro Oba; Akira Tabuse, both of Tokuyama; Koji Yasumoto, Hofu, all of Japan

[73] Assignee: Tokuyama Soda Kabushiki Kaisha, Yamaguchi, Japan

[22] Filed: July 23, 1973

[21] Appl. No.: 381,565

[30] Foreign Application Priority Data
July 26, 1972 Japan.................. 47-74107
Jan. 22, 1973 Japan.................. 48-8531

[52] U.S. Cl. ............................... 260/878 R
[51] Int. Cl. ............................... C08f 15/00
[58] Field of Search ................... 260/878 R

[56] References Cited
UNITED STATES PATENTS
3,381,056  4/1968  Beer .................. 260/878 R
3,557,253  1/1971  Sugimoto et al. ..... 260/878 R
3,626,028  12/1971  De Witt ............. 260/878 R

FOREIGN PATENTS OR APPLICATIONS
1,054,062  1/1967  United Kingdom ..... 260/878 R
41,008  3/1971  Japan ............... 260/878 R
41,009  3/1971  Japan ............... 260/878 R Primary Examiner—Joseph L. Schofer
Assistant Examiner—A. Holler
Attorney, Agent, or Firm—Sherman & Shalloway

[57] ABSTRACT

A process for preparing a vinyl chloride polymer composition having improved impact strength and processability which comprises dissolving an ethylene/propylene copolymer containing 0 to 0.5 mol% of an unsaturated unit and having a Mooney viscosity of 3 to 29 in a monomeric mixture consisting of 99.5 to 95.0 % by weight of vinyl chloride and 0.5 to 5 % by weight of an olefin having 2 to 8 carbon atoms, and polymerizing the monomeric mixture.

9 Claims, 4 Drawing Figures

PROCESS FOR PREPARING VINYL CHLORIDE POLYMER COMPOSITION HAVING IMPROVED IMPACT STRENGTH AND PROCESSABILITY

This invention relates to a process for preparing a vinyl chloride polymer composition having improved impact strength and processability. More specifically, the invention relates to a process for preparing a vinyl chloride graft copolymer of superior impact strength and a short fusion time, which comprises dissolving an ethylene/propylene copolymer in a monomeric mixture of vinyl chloride and an olefin, and polymerizing the monomeric mixture.

Polyvinyl chloride has heretofore found a wide range of utility as a low-cost synthetic resin for preparation of films, sheets and other fabricated products. Monomeric vinyl chloride has been copolymerized with vinyl acetate, vinyl ether, alpha-olefins, etc. to provide vinyl chloride polymers of good processability. However, vinyl chloride polymers in general have a defect of low impact strength. This defect is particularly outstanding with a vinyl chloride polymer of a low degree of polymerization exhibiting good processability, for example, a degree of polymerization ranging from 600 to 800. This defect has prevented the full utilization of the various superior properties of polyvinyl chloride in many fields. For example, polyvinyl chloride is not widely used in the field of architecture, because construction materials such as a sheet, bolt, bottle, pipe, combination joint and window frame require a high level of impact strength. Accordingly, the improvement of the impact strength of polyvinyl chloride has been an important research problem, and various proposals have been made in this regard. For example, attempts have been made to remedy this defect by blending polyvinyl chloride with polymers having a low glass transition temperature, such as an acrylonitrile/butadiene/styrene copolymer, an ethylene/propylene copolymer or an ethylene/vinyl acetate copolymer, or by blending polyvinyl chloride with chlorinated polyethylene. A process has also been proposed in which polyvinyl chloride is grafted to a copolymer such as described above. In these known methods, however, it is generally necessary to use large amounts of these components for improving the impact strength of polyvinyl chloride by blending or graft-copolymerizing them with polyvinyl chloride, in order to achieve satisfactory results. Since such impact strength-improving agents are rather expensive as compared with polyvinyl chloride and must be used in large quantities, these known methods are economically unsatisfactory.

Furthermore, some of the known impact strength improving agents remarkably reduce the processability of the resulting vinyl chloride polymer composition. For example, Japanese Patent Publication No. 2665/71 discloses a method for producing a vinyl chloride copolymer composition of high impact strength by grafting a vinyl chloride monomer to an ethylene/propylene copolymer having a Mooney viscosity of 30 to 130. However, this ethylene/propylene copolymer having such a higher Mooney viscosity is inherently difficult to comminute, and a vinyl chloride graft copolymer containing it as a trunk polymer has a long "fusion time", and has poor processability.

It is well known that in vinyl chloride synthetic resins, the "processability" is an important factor to determine the utility of the resin. Since vinyl chloride polymers have approximately equal melting temperatures and decomposition temperatures, it is the general practice to fabricate them at a temperature lower than the melting temperature of the vinyl chloride polymer. For example, a polyvinyl chloride obtained by suspension polymerization method which is a typical polymerization method for polyvinyl chloride is obtained in the form of particles, and these particles having a size of about 1 micron gather to form an agglomerate having a particle diameter of 10 to 300 microns. Plastic Age 13 (7), 63 (1967), and Polymer Engineering and Science 12 (3) 199 (1972) disclose that such a polyvinyl chloride is comminuted by a shearing force, and the comminuted particles are bonded by heat and pressure.

Accordingly, the ease of comminutation of the polyvinyl chloride agglomerate under the action of a certain shearing force by roll kneading or kneading by a screw of an extruder, that is, the ease of fusion, is an important characteristic in processing. The fusibility, that is, the ease of fusion, of vinyl chloride resins can be evaluated conveniently by a Brabender plastograph, as is shown, for example, in Kogyo Kagaku Zasshi (Journal of Chemical Society of Japan, Ind. Chem. Section) (1963). The ease of fusion at the time of kneading a vinyl chloride resin with certain additives at certain temperatures and pressures by a certain shearing force can be precisely evaluated by this method, and it is found that resins having a short fusion time have better processability. Furthermore, polyvinyl chloride resins of poor fusibility generally have poor processability, and in commercial practice, impact strength is often not imparted because of the irregularity of degree of fusion, etc. This tendency applies not only to polyvinyl chloride, but also to vinyl chloride polymers, copolymers, and polymer mixtures which have been modified to improve their impact strength and other physical properties.

Thus, in polymer compositions of vinyl chloride type, the fusion time is an important factor which affects the processability of the composition. This will be further described below.

First, taking the extrusion molding of a hard vinyl chloride polymer as an example, we will discuss the disadvantage that may be brought about by a long fusion time.

Basically, the step of producing fabricated articles of hard polyvinyl chloride (to be abbreviated as PVC hereinafter) is a step of comminuting PVC particles by heating and a shearing action, and melt-adhering the sintered fine particles by pressure. In this step, vigorous generation of heat necessarily occurs by friction between the PVC particles and friction between the PVC particles and the metal surface of the extruder cylinder. This local generation of heat causes the heat decomposition of PVC, that is, the dehydrochlorination. Accordingly, it is necessary to prescribe the temperature of the cylinder of an extruder at 140°–190°C. so that the temperature of the PVC resin passing through the extruder while generating heat does not exceed its decomposition temperature (about 210°C.). With a large-diameter extruder in which the removal of heat is difficult, the resin is cooled by flowing a cooling medium into the center of the screw. This is for the same reason.

Because of such special conditions for processing PVC resins the fusion time of PVC particles and the slipperiness of stabilizer formulations for processing have important significance.

When a PVC resin having a long fusion time is processed, two methods can be employed for expediting fusion. One method involves the use of a stabilizer of lower slipperiness, and the reduction of the amount of a slippery agent to provide a large frictional force. The other method is to increase the cylinder temperature of the extruder to elevate the temperature of the resin to near the melting point of the PVC (about 210°C.) to render the fusion easy. However, these methods result in promoting heat decomposition of PVC, and bring about an economical disadvantage that a large quantity of a stabilizer is required. Furthermore, corresponding to the non-uniformity of temperature in the extruder, the nonuniformity of fusion occurs to impair the physical properties of the polyvinyl chloride. Furthermore, a parison of PVC resin heated to near the melting point of PVC, after leaving the nozzle of the extruder, undergoes a great Barus effect and irregular heat shrinkage, making it impossible to give molded articles having smooth surfaces.

For this reason, in the processing of PVC resins, it is required that the resins have a temperature sufficiently lower (that is 10° to 20°C. lower) than their melting point (heat decomposition temperature) of about 210°C. and are capable of being comminuted mainly by a shearing force. In other words, better molded articles can be easily obtained with a shorter fusion time.

Accordingly, it is an object of this invention to provide a process for improving the processability, that is fusion time, of a vinyl chloride graft polymer composition comprising an ethylene/propylene copolymer as a trunk polymer while maintaining its impact strength and other advantageous properties inherent to polyvinyl chloride.

Another object of this invention is to provide a vinyl chloride polymer composition having markedly improved impact strength and processability by grafting only a small amount of an impact strength-improving agent.

Still another object of this invention is to provide a vinyl chloride graft polymer having a low brittle temperature.

Other objects and advantages of this invention will be apparent from the following description.

According to the present invention, the above objects and various advantages can be attained by a process which comprises dissolving an ethylene-propylene copolymer containing 0 to 0.5 mol% of an unsaturated unit and having a Mooney viscosity of from 3 to 29, in a monomeric mixture consisting of vinyl chloride and an olefin, and polymerizing the monomeric mixture.

A first feature of this invention is the use of an ethylene/propylene copolymer (to be referred to often as EPC) having a Mooney viscosity of 3 to 29 as a trunk polymer.

It was previously proposed to graft copolymerize vinyl chloride monomer and another monomer to an EPC trunk polymer in an attempt to improve impact strength of the polyvinyl chloride. However, EPC used for this purpose usually has a Mooney viscosity as high as 40 to 60. There was also a report suggesting that only vinyl chloride is graft polymerized with EPC having a Mooney viscosity lower than 30, but the impact strength and processability of polyvinyl chloride have not been investigated with an eye on the relation between the monomer to be grafted and the low Mooney viscosity of EPC.

When we extensively investigated into the possibility of improving the physical properties of vinyl chloride polymer compositions, such as impact strength and processability, using EPC having different Mooney viscosities, we found as shown in Table 1 below that ethylene/propylene copolymers having a Mooney viscosity of less than 30 which have been neglected in the art because of the lack of practical values unexpectedly improve not only the impact strength of vinyl chloride graft copolymers but also their processability, that is, fusibility (shortening the fusion time).

Table 1

| Runs Nos. | Mooney viscosity | EPC content (Wt.%) | Impact strength (Kg. cm/cm$^2$) | Fusion time (minutes: seconds) |
|---|---|---|---|---|
| 1 | 10 | 4.8 | 27.8 | 1:05 |
| 2 | 15 | 4.1 | 22.9 | 2:20 |
| 3 | 35 | 4.3 | 12.6 | 4:20 |
| 4 | 45 | 4.0 | 11.5 | 7:30 |
| 5 | 45 | 4.9 | 10.4 | 7:30 |

Note: In Runs Nos. 1 and 4, an ethylene/propylene/diene terpolymer was used, and in other Runs, an ethylene/propylene rubber was used. In Run No. 4, a monomeric mixture containing 3.2 % by weight of propylene was used.

As will be described in detail below, there is a close relation between the Mooney viscosity of the ethylene/propylene copolymer and the impact strength and processability of a vinyl chloride polymer composition containing it as a trunk polymer, and in order to obtain a vinyl chloride polymer composition having high impact strength and a markedly shortened fusion time, it is essential that the ethylene/propylene copolymer have a Mooney viscosity of 3 to 29, preferably 7 to 25, and most preferably 10 to 21. When the Mooney viscosity of the ethylene/propylene copolymer as a trunk polymer is less than 3, the resulting vinyl chloride polymer composition has good fusibility, but its impact strength is not sufficient and is unsatisfactory. Ethylene/propylene copolymers having a Mooney viscosity of at least 30 have markedly reduced impact strength and a prolonged fusion time, and are infeasible.

It is essential that such an ethylene-propylene copolymer be dissolved in a vinyl chloride monomer during the polymerization of the vinyl chloride monomer. Accordingly, the ethylene/propylene copolymer useful in the present invention must be soluble in a vinyl chloride monomer. Therefore, the ethylene/propylene copolymer used in this invention should generally be substantially non-crystalline. Furthermore, when an ethylene/propylene copolymer not dissolved in a vinyl chloride monomer is used, a uniform graft copolymer cannot be obtained, but a mixture of a vinyl chloride/olefin copolymer and a graft copolymer having vinyl chloride and the olefin grafted to the ethylene/propylene copolymer. This mixture does not exhibit desirable impact strength and fusion time.

The ethylene/propylene copolymer useful as a trunk polymer in the present invention should be soluble in vinyl chloride monomer and have a Mooney viscosity of the above specified range. The term "ethylene/propylene copolymer", as used in the present specification and appended claims, denotes not only an ethylene/propylene rubber (obtained by copolymerizing an ethylene monomer with a propylene monomer — may often be abbreviated to EPR), but also an ethylene/propylene terpolymer (may often be abreaviated to EPT) containing an unsaturated unit as a result of copolymerizing a monomeric mixture of ethylene, propylene and a diene.

The ratio between the ethylene unit and the propylene unit in the EPC is not critical. Generally, the ethylene/propylene ratio is preferably selected so that the resulting EPR exhibits rubbery elasticity. Usually, copolymers containing 39 to 87 mol%, preferably 50 to 74 mol%, more preferably 60 to 69 mol% of an ethylene unit are used.

The EPT can also contain at most 0.5 mol% of an unsaturated unit as a third component. The term "unsaturated unit" denotes a monomeric unit which leaves an unsaturated bond in the polymer chain when ethylene is copolymerized with propylene.

The content of the unsaturated unit in the EPT also has a close relation with the impact strength and fusion time of the vinyl chloride polymer composition obtained by the method of this invention. Work of the inventors has led to the discovery that ethylene/propylene/diene terpolymers containing 0.01 to 0.5 mol%, most preferably 0.05 to 0.4 mol%, of the unsaturated unit have improved impact strength and shortened fusion time.

The unsaturated unit may be a unit derived from a monomer selected from conjugated and unconjugated dienes. The conjugated dienes may, for example, be butadiene and isoprene. Examples of the unconjugated dienes are 1,4-hexadiene, dicyclopentadiene, 1,4-cyclohexadiene, methylene norbornene, or ethylidene norbornene. Generally, unconjugated dienes are preferred to conjugated dienes. Especially, ethylidene norbornene and dicyclopentadiene are preferred.

According to the process of this invention, the use of an ethylene/propylene/unsaturated unit terpolymer as a trunk polymer is more suitable as it will give a vinyl chloride polymer composition having the highest impact strength and the shortest fusion time.

The manner of preparing the ethylene/propylene copolymer is not critical. For example, propylene and ethylene are copolymerized in the presence or absence of an inert solvent using a Ziegler-type catalyst, and if EPT is intended, the diene is further copolymerized therewith. This polymerization means is well known for preparation of olefin polymers.

In the process of this invention, the ethylene/propylene copolymer is dissolved in a monomeric mixture of vinyl chloride and an olefin. The amount of EPC dissolved at this time may be varied according to the properties, utility, etc. of the intended vinyl chloride polymer composition. Generally, it is dissolved in an amount of 1 to 15 % by weight, preferably 4 to 8 % by weight, based on the resulting vinyl chloride composition. Of course, in actual operation, the amount of EPC to be added to the monomeric mixture is determined by assuming the conversion of the monomeric mixture. For example, the conversion of the monomeric mixture is usually about 85 %, and in this case, EPC is dissolved in an amount of 0.85 to 13 % by weight, preferably 3.4 to 6.8 % by weight, based on the monomeric mixture. If the amount of the ethylene/propylene copolymer to be dissolved in the monomeric mixture increases, for example, exceeds 15 % by weight, the viscosity of the monomeric mixture increases, making it difficult to disperse the monomeric mixture uniformly in a medium in suspension polymerization or emulsion polymerization. Further, the properties of the resulting graft-copolymer are drastically deteriorated, and the rigidity of PVC is lost.

When vinyl chloride is directly used as a monomer to be grafted to EPC, there can be obtained a vinyl chloride polymer composition having improved impact strength and processability to some extent but these properties are unsatisfactory.

Investigation of the inventors has revealed that when a mixture of vinyl chloride and 0.5 to 10 % by weight of vinyl acetate, methyl methacrylate or butyl acrylate which is a comonomer generally used with vinyl chloride for improving flowability or processability of polyvinyl chloride is grafted to EPC, the heat stability of the product is remarkably reduced as compared with the case of grafting only vinyl chloride to EPC, but surprisingly that when a mixture of vinyl chloride and an olefin is grafted to an ethylene/propylene copolymer, especially EPT, as a trunk polymer, not only the impact strength and fusion time of the resulting graft copolymer but also its heat stability are improved.

Table 2 below shows gear oven heat stability data of typical samples picked up from Example 1 to be given later on.

Table 2

| Run No. | Monomers to be grafted (parts by weight) | Heat stability (gear oven stability (minutes)) |
|---|---|---|
| 1 | Vinyl chloride+ethylene (97.6) (2.4) | 70 |
| 2 | Vinyl chloride+propylene (97.8) (2.2) | 80 |
| 3 | Vinyl chloride+i-butene (96.5) (3.5) | 85 |
| 4 | Vinyl chloride+vinyl acetate (95.0) (5.0) | 30 |
| 5 | Vinyl chloride+methyl methacrylate (98.0) (2.0) | 35 |
| 6 | Vinyl chloride+butyl acrylate (98.0) (2.0) | 45 |

The olefin to be used with vinyl chloride in the monomeric mixture can be chosen from a wide range of olefins according to the properties required of the resulting product. Generally, alpha-olefins such as ethylene, propylene, butene-1, isobutene, pentene-1, hexene-1, heptene-1 or octene-1, or cyclic olefin such as cyclohexene can be used in commercial operation. In other words, olefins having 2 to 8 carbon atoms, especially 2 to 4 carbon atoms can be suitably used. Our work has shown that of these, ethylene, propylene, isobutene, butene-1 are most suitable.

The amount of the olefin comonomer in the monomeric mixture has an important relation with the properties of a polymer composition obtained by graft polymerizing the monomeric mixture and EPC as a trunk polymer. As will be shown in Table 3, when the olefin is added in an amount of 0.5 to 5 % by weight, preferably 1.5 to 3.5 % by weight, based on the total weight of the monomeric mixture, the impact strength of the resulting polymer composition becomes high, and shows a peak when the amount of the olefin comonomer is 1.5 to 3.5 % by weight. On the other hand, when the amount of the olefin exceeds 5 % by weight, the polymerization temperature should be rendered extremely low, and the impact strength tends to be reduced. When the amount of the olefin comonomer exceeds 10 % by weight, it is commercially difficult to obtain a vinyl chloride polymer composition of high impact strength as intended by the present invention.

Table 3

| Runs Nos. | Monomer mixture Vinyl chloride (parts) | Propylene (parts) | Temperature of polymer (°C.) | EPT content in polymer (wt.%) | I.S. (kg.cm/cm²) |
|---|---|---|---|---|---|
| 1 | 100 | 0 | 58.0 | 0 | 7.3 |
| 2 | 99.3 | 0.7 | 55.3 | 0 | 6.7 |
| 3 | 97.8 | 2.2 | 51.5 | 0 | 4.2 |
| 4 | 96.5 | 3.5 | 48.0 | 0 | 4.4 |
| 5 | 94.2 | 5.8 | 38.0 | 0 | 4.0 |
| 6 | 99.3 | 0.7 | 55.3 | 4.3 | 25.5 |
| 7 | 97.8 | 2.2 | 51.5 | 4.6 | 26.8 |
| 8 | 96.5 | 3.5 | 48.0 | 4.5 | 26.4 |
| 9 | 94.2 | 5.8 | 38.0 | 4.4 | 21.1 |
| 10 | 98.5 | 1.5 | 53.1 | 4.3 | 23.6 |
| 11 | 96.5 | 3.5 | 48.0 | 4.5 | 24.1 |

Note: Runs Nos. 1 to 5 are comparative experiments. In Runs Nos. 6 to 9, EPT having a Mooney viscosity of 10, an unsaturated unit (ethylidene norbonene) content of 0.06 mol% and an ethylene content of 69 mol% was used, and in Runs Nos. 10 and 11, EPR having a Mooney viscosity of 15 and an ethylene content of 67 mol% was used. In each case, the polymerization was performed in accordance with Run No. 12 of Example 1.

In Runs Nos. 5 and 9, diisopropyl peroxydicarbonate was used instead of tertiary butyl perpivalate.

The polymerization temperature was varied according to the propylene content so that the degree of polymerization of the resulting polymer became about 1000.

Accordingly, in the present invention, it is necessary that the ethylene/propylene copolymer is dissolved in a monomeric mixture consisting of 99.5 to 95 parts by weight, preferably 98.5 to 96.5 parts by weight, of vinyl chloride and 0.5 to 5 parts by weight, preferably 1.5 to 3.5 parts by weight, of the olefin, and the monomeric mixture is subjected to polymerization conditions to graft the monomeric mixture to the ethylene/propylene copolymer.

Since ethylene or propylene is ordinarily used in the gaseous state, it is difficult or impossible to prepare in advance a mixture of such a comonomer with vinyl chloride which is in the liquid state at room temperature and atmospheric pressure. Accordingly, if ethylene or propylene is used as the comonomer, the ethylene/propylene copolymer is first dissolved in the vinyl chloride monomer, and then such a normally gaseous comonomer is fed continuously or at one time to the polymerization system while the resulting solution is being polymerized in suspension or emulsion under the conditions described above. Thus, the comonomer is polymerized together with the vinyl chloride monomer. This is also a feature with the monomeric mixture of the vinyl chloride monomer and the comonomer used in this invention. The olefin comonomer fed in the above-mentioned manner is readily mixed with the vinyl chloride monomer in the polymerization system, and the polymerization reaction intended in the present invention advances in such a state that the ethylene/propylene copolymer is dissolved in the resulting mixture of the vinyl chloride monomer and the olefin comonomer.

The manner of polymerizing the monomeric mixture of vinyl chloride and an olefin (these will be referred to as monomer components) containing an ethylene/propylene copolymer dissolved therein is not particularly critical, and any conventional emulsion and suspension polymerization techniques using a radical initiator can be utilized in this invention. Thus, the polymerization is carried out by emulsifying or suspending the resulting solution in an aqueous medium and polymerizing the emulsion or suspension in the presence of a radical polymerization catalyst.

Furthermore, known techniques of controlling the ratios of the monomer components to be graftcopolymerized, the distribution of the molecular fraction of the polymer composition produced, and the molecular weight of the product, etc. may be adopted as desired during the polymerization. For example, in the emulsion polymerization, 0.01 to 5 % by weight, based on the monomer components, of a water-soluble radical catalyst such as persulfates, e.g. potassium persulfate or ammonium persulfate, or hydrogen peroxide may be present together with a known emulsifier such as a cationic, anionic or nonionic surface active agent in the aqueous polymerization system comprisnig the monomeric mixture. The suspensionn polymerization may be performed in an aqueous polymerization system in the presence of 0.01 to 5 % by weight, based on nthe monomer components, of an oil-soluble radical catalyst, for example, peroxides such as lauroyl peroxide or benzoyl peroxide, azo compounds such as azobisisobutyronitrile, and diisopropyl peroxycarbonate and tert.-butyl perpivalate, and also in the presence of an appropriate amount of a suspension polymerization stabilizer such as methyl cellulose, a hydroxyalkyl cellulose, polyvinyl alcohol, or polyvinyl pyrrolidone. Suitable temperatures for these polymerization operations differ depending on the types of the monomer components to be used, but generally, the polymerization temperature is 30° to 80°C., preferably 40° to 70°C.

The suspension or emulsion polymerization techniques disclosed, for example, in Chemical Engineering, 74 (10), pp 151–158 (1967), ibid., 74 (14), pp 85–92 (1967), etc. may also be applied to the polymerization of the monomeric mixture.

The resulting vinyl chloride polymer composition of this invention can be blended with any of the known impact strength-improving agents, such as an acrylonitrile/butadiene/styrene copolymer, a methyl methacrylate/butadiene/styrene/copolymer, or an acrylonitrile/methyl methacrylate/butadiene/styrene copolymer. For example, a polymer composition having superior impact strength can be obtained by blending 1 to 10 parts of an impact strength-improving agent with 99 to 90 parts of the vinyl chloride polymer composition of this invention.

In order to demonstrate more clearly the criticality of the Mooney viscosity of the ethylene/propylene copolymer as a trunk polymer and the diene content of the ethylene/propylene/diene terpolymer, the invention will be further described below with reference to the accompanying drawings in which.

Figure 1:
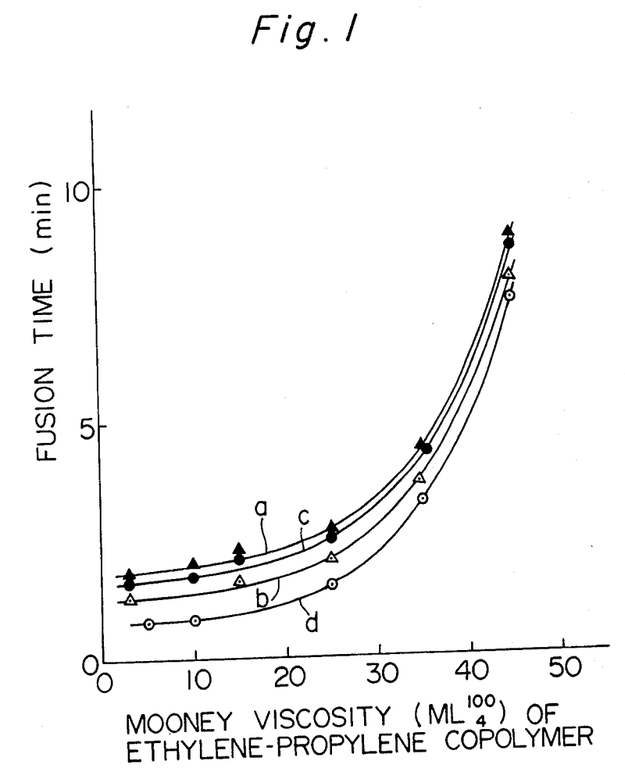
FIG. 1 is a graphic representation showing the influence of the Mooney viscosity of EPC on the fusion time of the product.

FIG. 1 shows the relation between the Mooney viscosity of the trunk polymer ($ML_4^{100}$) and the fusion time (minutes) of the resulting polymer composition. Curves a and b refer to an ethylene/propylene rubber (ethylene content 65–68 mol%) as the trunk polymer, and curves c and d, to an ethylene/propylene/ethylidene norbornene terpolymer (ethylene content 60–69 mol%, ethylidene norbornene content 0.05 to 0.1 mol%) as the trunk polymer. The monomer components shown below were grafted to these polymers to make polymer compositions.

| Curves | Monomer components used (parts by weight) | Average content of the trunk polymer in the resulting polymer composition (wt.%) |
|---|---|---|
| a | Vinyl chloride (100) | 4.4 |
| b | Vinyl chloride (97.8) + propylene (2.2) | 4.2 |
| c | Vinyl chloride (100) | 4.4 |
| d | Vinyl chloride (97.8) + propylene (2.2) | 4.2 |

Figure 2:
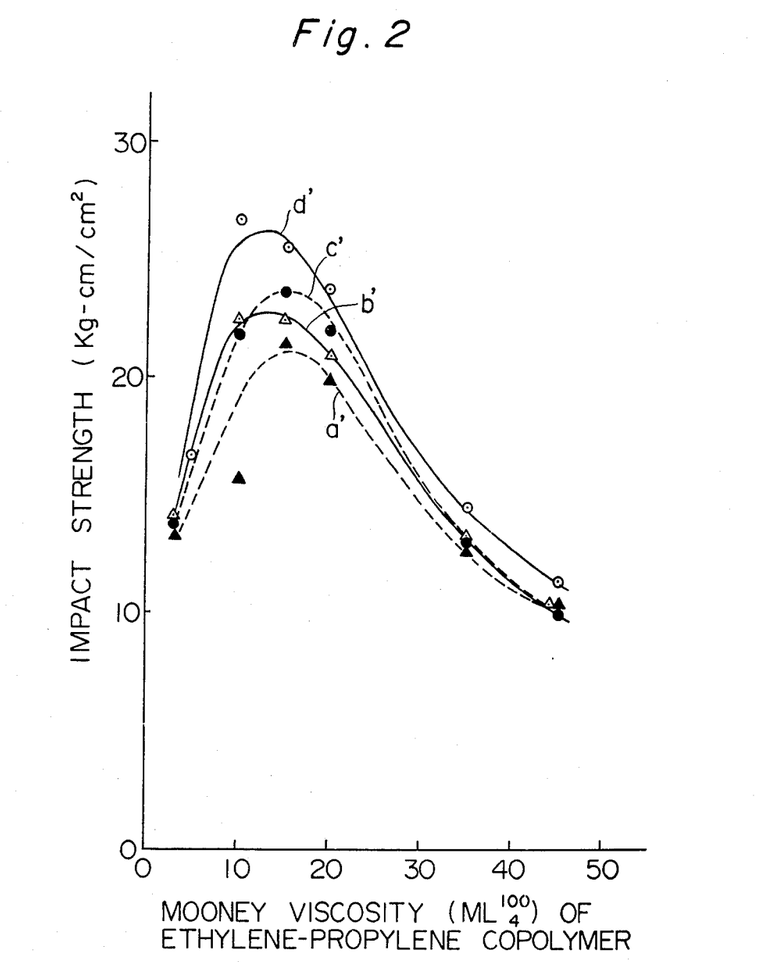
FIG. 2 is a graphic representation showing the influence of the Mooney viscosity of EPC on the impact strength of the product.

Curves $a'$, $b'$, $c'$ and $d'$ of FIG. 2 show the relations between the Mooney viscosity ($ML_4^{100}$) and the impact strength. The trunk polymers and the resulting polymer compositions are the same as those of curves a, b, c, and d.

As is clear from curves a, b, c and d in FIG. 1, if the Mooney viscosity of the ethylene/propylene polymer is less than 30, the fusion time of the polymer composition is markedly shortened, and the processability of the polymer composition is markedly improved. This will substantiate the fact that graft copolymers produced by using commercially available ethylene/propylene copolymers (usually having a Mooney viscosity of 40 to 120) are not feasible.

It will also be seen from FIG. 1 that the fusion time is shortened to a greater degree by using a mixture of vinyl chloride and an olefin as monomer components than by using vinyl chloride alone.

Examinations of curves $a'$, $b'$, $c'$ and $d'$ of FIG. 2 shows that if the Mooney viscosity of the ethylene/propylene copolymer is less than 30, especially within the range of 29 to 3, polymer compositions of higher impact strength than those obtained with Mooney viscosities outside the above range can be obtained, and with the Mooney viscosity of the ethylene/propylene copolymer is in the range of 7 to 25, there can be provided a polymer composition having very much increased impact strength. In addition, these curves show that the use of a mixture of vinyl chloride and an olefin contributes to a greater degree of improvement of impact strength than the use of vinyl chloride alone.

Taking all of the above facts into consideration, it will be understood that in order to obtain a vinyl chloride polymer composition having short fusion time, superior processability and high impact strength, the Mooney viscosity of the ethylene/propylene trunk polymer should be 3 to 29, and the monomeric mixture of vinyl chloride and an olefin should be used.

Figure 3:
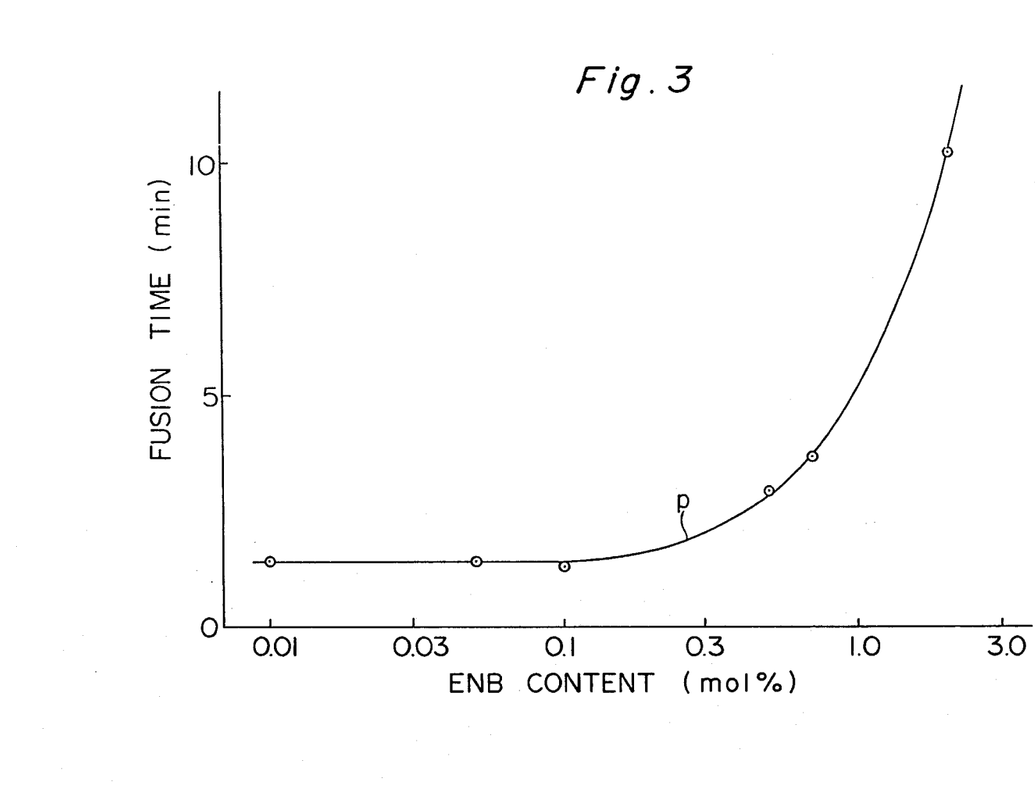
FIG. 3 is a graphic representation showing the influence of the content of unsaturated unit of EPT on the fusion time of the product when ethylidene norbornene is used as the unsaturated unit.
Figure 4:
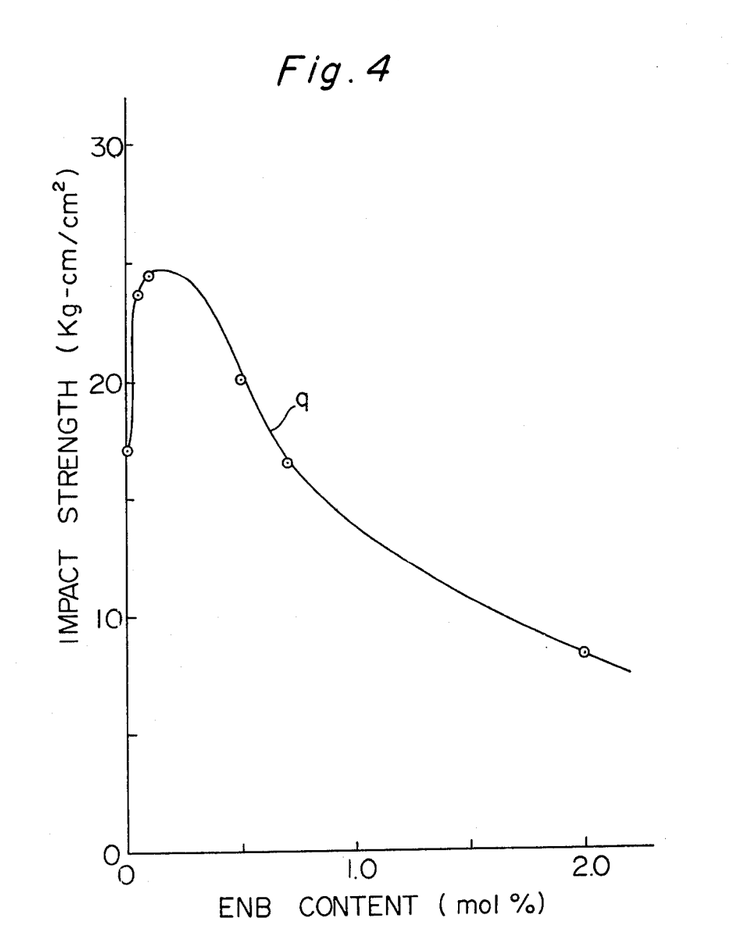
FIG. 4 is a graphic representation showing the influence of the content of unsaturated unit of EPT on the fusion time of the product when ethylidene norbornene is used as the unsaturated unit.

Curves p and q in FIGS. 3 and 4 show the influence of the content of the unsaturated unit in the ethylene/propylene terpolymer used as trunk polymer on the fusion time (curve p) and impact strength (curve q) of the polymer composition prepared from it in accordance with the process of this invention. Here, an ethylene-propylene terpolymer having an ethylene content of 66 to 69 mol% and a Mooney viscosity of 16 to 24 was used as the trunk polymer, and ethylidene norbornene (ENB) was used as the unsaturated unit. A monomeric mixture consisting of 97.8 parts by weight of vinyl chloride and 2.2 parts by weight of propylene was used for grafting to the trunk polymer.

It is seen from curves p and q that when the ENB content is not more than 0.5 mol%, the fusion time of the polymer composition decreases abruptly, and the impact strength of the polymer composition increases, and therefore that the ENB content should be not more than 0.5 mol%. Furthermore, curve q shows that when 0.05 to 0.4 mol% of the ENB component is present, there is a marked improvement in impact strength.

According to the most preferred embodiment of this invention, there is provided a process for preparing a vinyl chloride polymer composition, which comprises a. dissolving an ethylene/propylene terpolymer containing 0.05 to 0.4 mol% of an unsaturated unit and having a Mooney viscosity of 7 to 25 in a monomeric mixture consisting of 99.5 to 95 parts by weight of a vinyl chloride monomer and 0.5 to 5 parts by weight of an olefin monomer, the amount of the ethylene/propylene terpolymer being 4 to 8 % by weight based on the vinyl chloride polymer composition obtained, b. emulsifying or suspending the resulting solution in water, c. polymerizing the emulsified or suspended solution at a temperature of 40° to 70°C. in the presence of 0.01 to 5 % by weight, based on the monomeric mixture, of a radical polymerization catalyst, and d. recovering the resulting polymer composition.

The vinyl chloride polymer compositions obtained in accordance with the process of this invention has very shortened fusion time and hence markedly improved processability. Also, these polymer compositions have excellent impact strength which can be advantageously maintained at a satisfactorily high level even under low temperature conditions.

The vinyl chloride polymer compositions of the invention can advantageously find applications in many fields where polyvinyl chloride resins have not been fully utilized because of their low impact strength.

The invention will now be illustrated further by the following Examples and Comparative Examples which in no way limit the scope of this invention. The physical properties shown in the Examples and Comparative Examples were measured by the following methods.

Impact strength test

Roll sheets were superposed, and a 10 mm thick plate was produced in accordance with the conditions shown in Table A below. The Sharpy impact strength values were measured in accordance with JIS K-6745. These values will be abbreviated below to I.S.

Tensile strength

Measured in accordance with JIS K-6745. This will be abbreviated to T.S. below.

Heat Stability

Measured in a gear oven at 180°C.

Fusion time 63 gr. of a resin compounded in accordance with the direction shown in Table A was subjected to measurement using a Brabender plastograph at 170°C. at 30 rpm.

Flow temperature

A pellet obtained by pressing for 5 minutes at 100 Kg/cm$^2$ at 130°C. was heated, and flowed out from a die having a length of 1 mm and a diameter of 1 mm at a pressure of 70 Kg/cm$^2$. Using a "Koka" flow tester (product of Shimazu Seisakusho Co., Ltd.), the temperature at which the amount of flow was $2 \times 10^{-3}$ cm$^2$/sec. was measured.

Mooney viscosity $ML_1^{100} + 4$ values were measured using a Mooney viscometer.

Formulation and Sheet-Forming Conditions

Table A

| Vinyl chloride graft polymer | 100 parts |
|---|---|
| Tribasic lead sulfate | 0.5 |
| Lead stearate | 0.5 parts |
| Calcium stearate | 0.4 |
| Lubricant | 0.4 |
| Dibutyltin maleate | 0.3 |
| Dibutyltin laurate | 0.5 |

(2) Sheet-forming conditions

The material was kneaded at 165°C. for 5 minutes using a roll with a diameter of 6 inches, and then pressed into a sheet under the conditions shown in Table B.

Table B 1 mm sheet, 175°C., preheating 10 minutes, 70 Kg/cm$^2$ press 15 minutes, 100 Kg/cm$^2$ press 1 minute; 10 mm sheet 175°C., preheating 25 minutes, 200 Kg/cm$^2$ press 15 minutes.

The following abbreviations will be used in the Examples and the Comparative Examples.

LII: tertiary butyl prepivalate
LPO: lauroyl peroxide
ND: tertiary butyl peroxyneodecanate
MMA: methyl methacrylate
ENB: ethylidene norbornene
CHD: 1,4-cyclohexadiene
DCPD: dicyclopentadiene
EPT: ethylene/propylene terpolymer
$C'_2$: ethylene unit
$C'_3$: propylene unit
I.S.: impact strength
T.S.: tensile strength

EXAMPLE 1

A 50-liter polymerization vessel equipped with a stirrer was charged with 200 parts of pure water, 0.2 part of methyl cellulose, 0.06 part of polyoxyethylene nonylphenyl ether, and EPT having the properties shown in Table 4. The polymerization vessel was then purged with nitrogen gas, and then evacuated to a pressure of 10 mmHg. Then a mixture of vinyl chloride monomer and ethylidene norbornene as a third component in the ratios indicated in Table 4 was introduced into the vessel, and the entire mixture was stirred for 8 hours at room temperature to dissolve EPT. Then, the catalyst shown in Table 4 was added, and the reaction mixture was heated to the temperature indicated in Table 4 and polymerized for the predetermined time. Then, by the same operation as Examle 1 above, a white powder and a test piece were obtained. The recipe was one shown in Table A.

Table 4 also include data of Runs Nos. 10, 15, 16 and 17 which were conducted in the same way for comparative purposes.

Table 4

| Run No. | EPT Content of ENB as 3rd component (mol%) | EPT Ethylene content (mol%) | EPT Moony viscosity $ML_{1+4}^{100}$ | Amount (parts) | Vinyl chloride (parts) | Coponomer Type | Coponomer Amount (parts) |
|---|---|---|---|---|---|---|---|
| 1 | 0.05 | 65 | 16 | 2.4 | 97.6 | Ethylene | 2.4 |
| 2 | 0.09 | 67 | 25 | 2.4 | 96.5 | propylene | 3.5 |
| 3 | 0.09 | 67 | 25 | 2.4 | 98.0 | Butene | 2.0 |
| 4 | 0.1 | 66 | 18 | 2.4 | 99.5 | Propylene | 0.5 |
| 5 | 0.1 | 66 | 18 | 3.2 | 97.8 | Propylene | 2.2 |
| 6 | 0.1 | 66 | 18 | 3.2 | 94.5 | Propylene | 5.5 |
| 7 | 0.05 | 67 | 15 | 4.8 | 90.0 | Propylene | 10.0 |
| 8 | 0.01 | 69 | 24 | 3.2 | 97.8 | Propylene | 2.2 |
| 9 | 0.1 | 66 | 18 | 3.2 | 97.8 | Propylene | 2.2 |
| 10 | 0.7 | 65 | 21 | 3.2 | 97.8 | Propylene | 2.2 |
| 11 | 0.1 | 47 | 5 | 3.2 | 97.8 | Propylene | 2.2 |
| 12 | 0.06 | 69 | 10 | 3.2 | 97.8 | Propylene | 2.2 |
| 13 | 0.09 | 68 | 25 | 3.2 | 97.8 | Propylene | 2.2 |
| 14 | 0.05 | 63 | 18.5 | 8.0 | 97.8 | Propylene | 2.2 |
| 15 | 0.05 | 65 | 15 | 3.2 | 95.0 | Vinyl acetate | 5.0 |
| 16 | 0.1 | 66 | 18 | 3.2 | 98.0 | Acrylic acid | 2.0 |
| 17 | 0.09 | 68 | 25 | 3.2 | 98.0 | MMA | 2.0 |
| 18 | 0.06 | 68 | 18 | 3.2 | 97.8 | Propylene | 2.2 |
| 19 | 0.06 | 73 | 16 | 3.2 | 97.8 | Propylene | 2.2 |
| 20 | 0.07 | 82 | 17 | 3.2 | 97.8 | Propylene | 2.2 |

Table 4-continued

| Run No. | Catalyst Type | Amount (parts) | Polymerization conditions Temperature (°C.) | Time (hr: min.) | Yield (%) | EPT content (wt%) | I.S. (Kg. cm/cm²) | T.S. (Kg/cm²) | Fusion time (min: sec) | Heat stability (min) |
|---|---|---|---|---|---|---|---|---|---|---|
| 1 | LII | 0.06 | 60.0 | 10:00 | 81.5 | 2.85 | 14.8 | 515 | 45" | 78 |
| 2 | LII | 0.10 | 52.0 | 14:00 | 70.3 | 3.3 | 15.2 | 505 | 1'40" | 85 |
| 3 | LII | 0.12 | 54.0 | 9:00 | 82.6 | 2.8 | 14.1 | 515 | 1'45" | 75 |
| 4 | LII | 0.03 | 56.0 | 9:00 | 80.4 | 2.9 | 15.3 | 517 | 1'30" | 80 |
| 5 | LII | 0.06 | 51.5 | 12:00 | 75.8 | 4.2 | 25.1 | 492 | 1'25" | 80 |
| 6 | ILI | 0.12 | 49.0 | 18:00 | 78.7 | 4.1 | 17.9 | 460 | 40" | 80 |
| 7 | LII | 0.12 | 50.0 / 59.0 | 16:00 / 8:00 | 83.2 | 3.8 | 17.8 | 455 | 10" | — |
| 8 | ND | 0.13 | 51.5 | 4:00 | 63.5 | 4.8 | 17.2 | 443 | 1'25" | 80 |
| 9 | LII | 0.10 | 51.5 | 12:00 | 75.1 | 4.3 | 24.5 | 486 | 1'20" | 80 |
| 10 | LII | 0.10 | 51.5 | 9:00 | 71.0 | 4.5 | 16.5 | 503 | 3'45" | 80 |
| 11 | LII | 0.10 | 51.5 | 11:00 | 81.5 | 3.9 | 16.6 | 508 | 50" | 80 |
| 12 | LII | 0.08 | 51.5 | 6:30 | 65.8 | 4.6 | 26.8 | 457 | 50" | 80 |
| 13 | LII | 0.06 | 51.5 | 10:00 | 72.0 | 4.4 | 17.8 | 488 | 1'30" | 80 |
| 14 | LII | 0.10 | 51.5 | 7:50 | 70.2 | 10.9 | 65.4 | 367 | 30" | 85 |
| 15 | LII | 0.03 | 53.0 | 10:00 | 78.0 | 3.9 | 14.6 | 470 | 35" | 30 |
| 16 | LII | 0.03 | 58.0 | 7:30 | 83.4 | 3.6 | 17.3 | 489 | 1'10" | 45 |
| 17 | LPO | 0.03 | 61.0 | 7:00 | 85.3 | 3.7 | 13.4 | 510 | 35" | 35 |
| 18 | ND | 0.10 | 51.5 | 5:30 | 78.8 | 4.1 | 18.9 | 477 | 50" | 80 |
| 19 | ND | 0.10 | 51.5 | 5:10 | 70.2 | 4.4 | 19.1 | 486 | 50' | 80 |
| 20 | ND | 0.10 | 51.5 | 5:10 | 70.2 | 4.4 | 21.0 | 482 | 1'00" | 80 |

EXAMPLE 2

Example 1 was repeated except that the third component of EPT was varied as shown in Table 5. The results are shown in Table 5.

Table 5

| Run No. | EPT 3rd component Type | Content (mol%) | C'₂ content (mol%) | Moony viscosity ML₁₊₄¹⁰⁰ | Amount (parts) | Vinyl chloride monomer Parts | Comonomer Type | Parts |
|---|---|---|---|---|---|---|---|---|
| 1 | CHD | 0.06 | 63 | 22 | 3.2 | 97.0 | Propylene | 3.0 |
| 2 | DCPD | 0.09 | 67 | 16 | 3.2 | 97.0 | " | 3.0 |

| Run No. | Catalyst Type | Parts | Polymerization conditions Temperature (°C.) | Time (hr: min) | Conversion (%) | EPT content (wt%) | I.S. (Kg cm/cm²) | T.S. (Kg/cm²) | Fusion time (min: sec) | Heat stability (min) |
|---|---|---|---|---|---|---|---|---|---|---|
| 1 | ND | 0.10 | 50 | 10:00 | 73.5 | 4.2 | 18.3 | 494 | 1'00" | 75' |
| 2 | ND | 0.10 | 50 | 10:30 | 80.2 | 3.8 | 15.2 | 504 | 55" | 80' |

COMPARATIVE EXAMPLE 1

EPR shown in Table 6 was placed in a 2-liter autoclave equipped with a stirrer, and the autoclave was evacuated to a pressure of 10 mmHg after purging with nitrogen. 100 parts of vinyl chloride was introduced, and the entire mixture was stirred at room temperature for 8 hours to dissolve EPT. Another autoclave equipped with a stirrer and having an inner capacity of 5 liters was charged with 200 parts of water, 0.2 part of polyvinyl alcohol and a catalyst in the amount indicated in Table 6, purged with nitrogen, and evacuated to a pressure of 10 mmHg. The resulting solution of EPT in vinyl chloride monomer was completely transferred to this autoclave. Then, with continued stirring, the autoclave was heated to the temperature indicated in Table 6, and the polymerization was started. The polymerization was continued for the time indicated in Table 6. The unreacted vinyl monomer was purged, and the slurry was withdrawn, filtered and dried to form a white power. This white powder was compounded in accordance with the recipe shown in Table A, and kneaded by a roll. The kneaded mixture was press formed into a sheet. The powder and sheet were subjected to the tests mentioned above. The results are shown in Table 6.

Table 6

| Run No. | EPR Ethylene content (mol%) | Moony viscosity ML¹⁰⁰₁₊₄ | Amount (parts) | Catalyst Type | Amount (parts) | Polymerization conditions Temperature (°C.) | Time (hr: min) | Yield (%) | EPR content (wt%) | I.S. (Kgcm/cm²) | T.S. (Kg/cm²) | Fusion time (min: sec) | Tf (°C.) |
|---|---|---|---|---|---|---|---|---|---|---|---|---|---|
| 1 | 65 | 35 | 3.2 | LII | 0.08 | 58 | 4:00 | 72.0 | 4.3 | 12.6 | 481 | 4'20" | 149.0 |

Table 6-continued

| Run No. | EPR Ethylene content (mol%) | EPR Moony viscosity ML¹⁺⁴ | Amount (parts) | Catalyst Type | Catalyst Amount (parts) | Polymerization conditions Temperature (°C.) | Polymerization conditions Time (hr: min) | Results Yield (%) | Results EPR content (wt%) | Results I.S. (Kgcm/cm²) | Results T.S. (Kg/cm²) | Results Fusion time (min: sec) | Results Tf (°C.) |
|---|---|---|---|---|---|---|---|---|---|---|---|---|---|
| 2 | 65 | 45 | 3.2 | LII | 0.08 | 58 | 3:40 | 62.7 | 4.9 | 10.4 | 460 | 7'30" | 152.3 |

EXAMPLE 3

Example 1 was repeated except that EPR having the properties shown in Table 7 was used instead of EPT under the conditions shown in Table 7. The powder and sheet obtained were subjected to the tests mentioned above. The results are also shown in Table 7.

Table 7 also contains data for Runs Nos. 7 to 9 which were performed for comparative purposes.

Table 7

| Run No. | EPR Ethylene content (mol%) | EPR Moony viscosity ML₁₊₁¹⁰⁰ | Amount (parts) | Vinyl chloride monomer Amount (parts) | Comonomer Type | Comonomer Amount (parts) | Catalyst Type | Catalyst Amounts (parts) |
|---|---|---|---|---|---|---|---|---|
| 1 | 65 | 17.5 | 4.0 | 97.6 | Ethylene | 2.4 | LII | 0.06 |
| 2 | 66 | 15 | 3.0 | 99.5 | Propylene | 0.5 | LII | 0.03 |
| 3 | 66 | 15 | 3.0 | 97.8 | " | 2.2 | LII | 0.08 |
| 4 | 66 | 15 | 3.0 | 90.0 | " | 10.0 | LII | 0.12 |
| 5 | 74 | 25 | 3.2 | 96.0 | Isobutene | 4.0 | LII | 0.10 |
| 6 | 74 | 19 | 3.2 | 96.0 | Heptene-1 | 4.0 | ND | 0.12 |
| 7 | 68 | 22 | 3.2 | 95.0 | Vinyl acetate | 5.0 | ND | 0.04 |
| 8 | 66 | 17.5 | 3.2 | 98.0 | Butyl acrylate | 2.0 | ND | 0.04 |
| 9 | 66 | 15 | 3.2 | 98.0 | MMA | 2.0 | ND | 0.03 |

| Run No. | Polymerization conditions Temperature (°C.) | Polymerization conditions Time (hr: min) | Yield (%) | EPR content (wt%) | I.S. (Kg cm/cm²) | T.S. (Kg/cm²) | Heat stability (min.) | Fusion time (min: sec) | Tf (°C) |
|---|---|---|---|---|---|---|---|---|---|
| 1 | 60.0 | 10:20 | 82.3 | 4.6 | 20.5 | 470 | 75 | 1'00" | 142.8 |
| 2 | 54.0 | 11:00 | 80.2 | 3.6 | 15.7 | 515 | 80 | 2'10" | 143.6 |
| 3 | 51.5 | 11:40 | 76.5 | 3.8 | 20.8 | 490 | 80 | 1'35" | 142.0 |
| | 50.8 | 14:00 | | | | | | | |
| 4 | 58.0 | 8:00 | 75.4 | 3.8 | 14.2 | 440 | — | 30" | 138.3 |
| 5 | 56.0 | 12:20 | 73.7 | 4.2 | 17.9 | 476 | 85 | 1'00" | 140.1 |
| 6 | 56.0 | 9:20 | 78.1 | 3.9 | 15.1 | 483 | 75 | 1'10" | 142.4 |
| 7 | 58.0 | 8:00 | 82.4 | 3.7 | 13.2 | 492 | 35 | 1'30" | 139.0 |
| 8 | 56.0 | 7:30 | 82.6 | 3.7 | 15.4 | 488 | 45 | 1'20" | 132.6 |
| 9 | 61.0 | 7:00 | 83.3 | 3.7 | 12.0 | 480 | 35 | 1'20" | 138.5 |

What we claim is:

1. A process for preparing a vinyl chloride polymer composition having improved impact strength and processability which comprises dissolving 1 to 15% by weight based on the resulting vinyl chloride polymer composition of an ethylene/propylene copolymer containing 0 to 0.5 mol % of an unsaturated unit and having a Mooney viscosity of 3 to 29 in a monomeric mixture consisting of 99.5 to 95.0% by weight of a vinyl chloride and 0.5 to 5% by weight of an olefin having 2 to 8 carbon atoms, and polymerizing the monomeric mixture.

2. The process of claim 1 wherein said ethylene/propylene copolymer has a Mooney viscosity of 7 to 25.

3. The process of claim 1 wherein said ethylene/propylene copolymer is a terpolymer containing 0.05 to 0.4 mol% of an unsaturated unit.

4. The process of claim 3 wherein said unsaturated unit is derived from a monomer selected from conjugated and nonconjugated dienes.

5. The process of claim 4 wherein said diene is selected from the group consisting of butadiene, isoprene, 1,4-hexadiene, dicyclopentadiene, 1,4-cyclohexadiene, methylene norbornene and ethylidene norbornene.

6. The process of claim 1 wherein said ethylene/propylene copolymer contains 39 to 87 mol% of a unit derived from an ethylene monomer.

7. The process of claim 1 wherein said olefin is selected from the group consisting of ethylene, propylene, butene-1, isobutene, pentene-1, hexene-1, cyclohexene, heptene-1 and octene-1.

8. The process of claim 1 wherein the polymerization is carried out by emulsifying or suspending the resulting solution in an aqueous medium and polymerizing the emulsified or suspended solution at a temperature of 30° to 80°C. in the presence of a radical polymerization catalyst.

9. The process of claim 1, which comprises a. dissolving an ethylene/propylene terpolymer containing 0.05 to 0.4 mol% of an unsaturated unit and having a Mooney viscosity of 7 to 25 in a monomeric mixture consisting of 99.5 to 90 parts by weight of a vinyl chloride monomer and 0.5 to 5 parts by weight of an olefin monomer, the amount of the ethylene/propylene terpolymer being 4 to 8 % by weight based on the vinyl chloride polymer composition obtained, b. emulsifying or suspending the resulting solution in water, c. polymerizing the emulsified or suspended solution at a temperature of 40° to 70°C. in the presence of 0.01 to 5 % by weight, based on the monomeric mixture, of a radical polymerization catalyst, and d. recovering the resulting polymer composition.

* * * * *